United States Patent Office 3,835,032
Patented Sept. 10, 1974

3,835,032
CATALYTIC CRACKING WITH SILVER-RARE EARTH OR COPPER-RARE EARTH EXCHANGED Y-TYPE ZEOLITE
Geoffrey E. Dolbear, Columbia, and John S. Magee, Cooksville, Md., assignors to W. R. Grace & Co., New York, N.Y.
No Drawing. Continuation-in-part of abandoned application Ser. No. 166,243, July 26, 1971. This application Mar. 26, 1973, Ser. No. 344,963
Int. Cl. C10g 11/02
U.S. Cl. 208—120                    6 Claims

ABSTRACT OF THE DISCLOSURE

A silver-rare earth or copper-rare earth exchanged zeolite cracking catalyst capable of producing high octane gasoline of increased aromatic content. Silver or copper ions in combination with rare earth ions are exchanged into a synthetic Y-type zeolite using a combination of exchange and calcination steps. The exchanged zeolite is advantageously combined with a major portion of inorganic oxide matrix to produce a catalyst suitable for use in standard commercial fluid and moving bed cat-cracking units.

---

This application is a continuation-in-part of application Ser. No. 166,243 filed July 26, 1971, and now abandoned.

The present invention relates to hydrocarbon cracking catalysts, and more specifically to improved zeolite cracking catalyst compositions which are capable of producing a high yield of aromatic gasoline fractions of enhanced octane rating.

It is generally known that hydrocarbon cracking catalysts which are promoted with stabilized zeolites, particularly ion exchanged synthetic faujasite, i.e., Y-type zeolite, are capable of producing high yields of gasoline fractions from petroleum feedstocks such as gas oil. These cracked gasoline fractions are subsequently combined with octane enhancing additives such as tetraethyl lead to produce high octane motor fuel.

Recent emphasis on air pollution control has dictated a need for removing metal type octane enhancing additives from commercial gasolines. To produce non-leaded gasoline of sufficient octane rating for use in modern automobile engines it is generally necessary for the refiner to use a blend of petroleum gasoline fractions which are of inherently high octane rating. Highly aromatic gasoline fractions are of particular use to the refiner. Unfortunately, however, gasoline fractions produced by the cat-cracking of gas oil using normal amorphous and crystalline zeolite type cracking catalysts are of relatively low aromatic content. Accordingly, relatively expensive subsequent catalytic treatment is generally required to increase the aromatic content, and hence the octane rating of cat-crack gasolines, and thereby avoid the addition of lead type octane enhancing additives.

It is therefore an object of the present invention to provide cat-cracked gasoline fractions which possess an increased aromatic content.

It is another object to provide an improved catalytic cracking catalyst composition which is capable of producing a high yield of gasoline fractions which exhibit increased octane rating without the addition of octane enhancing additives.

It is still another object to provide a highly active metal exchanged zeolite catalyst which is capable of cracking petroleum hydrocarbon feedstocks to produce highly aromatic type gasoline fractions.

It is yet another object to provide a metal exchanged synthetic faujasite containing fluid cat-cracking catalyst which is suitable for use in commercial cracking units and which is capable of producing gasoline of inherently higher octane rating than normally obtained using zeolite promoted cat-cracking catalysts.

It is yet a further object to provide a metal exchanged Y-type zeolite cat-cracking catalyst which will produce high yields of aromatic gasoline without producing attendant excessive quantities of undesirable coke and dry gas fractions.

These and still further objects of the present invention will become readily apparent to one skilled in the art from the following detailed description and specific examples.

Broadly, our invention contemplates a zeolite cracking catalyst which comprises synthetic Y-type zeolite exchanged with silver or copper ions in combination with rare earth ions.

More specifically, we have made the surprising finding that a Y-type zeolite having a silica to alumina ratio in excess of about 3.0 which has been ion exchanged from about 1 to 10% by weight silver ions expressed as $Ag_2O$ or copper ions expressed as $CuO$, and from about 3 to 15% by weight rare earth ions expressed as $RE_2O_3$ will catalyze the cracking of petroleum to produce gasoline fractions of unusually high aromatic content. Even more surpurising, is our finding that the present silver or copper rare earth exchanged Y-type zeolite, i.e., Ag-RE-Y or Cu-RE-Y contemplated herein, when used as a hydrocarbon cracking catalyst or catalyst additive, will produce only minor amounts of undesirable coke and/or dry gas fractions.

The presently contemplated Ag-RE-Y and Cu-RE-Y catalyst may be produced by one of two techniques. In general, the first technique involves the following steps:

(1) A sodium Y-type zeolite possessing a silica to alumina ratio in excess of about 3 is exchanged with ammonium salt solution, such as ammonium sulfate or ammonium chloride, to reduce the sodium oxide ($Na_2O$) level of said sodium Y-type zeolite to about 1.5 to 4% by weight.

(2) The ammonium salt exchanged zeolite is then exchanged with a rare earth salt solution, either rare earth chloride or rare earth sulfate, to impart a $RE_2O_3$ content of from about 0.3 to 15% by weight.

(3) The rare earth exchanged zeolite is then calcined at a temperature of about 700–1600° F. for a period of 0.1 to 3 hours.

(4) Subsequently, the calcined exchanged zeolite is exchanged again with ammonium salt solution to lower the soda content to less than about 1% by weight.

(5) The above reexchanged zeolite is then contracted with a solution of silver or copper ions, preferably silver nitrate or copper chloride to impart a silver or copper content measured as $Ag_2O$ or $CuO$ of from about 1 to 10% by weight.

(6) The Ag-RE-Y or Cu-RE-Y exchanged zeolite is then calcined at a temperature of from about 500 to 1400° F. for a period of 1 to 10 hours.

A second procedure which may be used to prepare the presently contemplated Ag-RE-Y or Cu-RE-Y catalyst involves the following general procedure:

(1) A synthetic sodium Y-type zeolite having a silica to alumina ratio greater than about 3 is exchanged with a solution which contains a mixture of silver or copper and rare earth ions, preferably rare earth nitrate, at a pH of from about 3.0 to 3.5. This procedure imparts a silver-rare earth or copper-rare earth content of from about 1 to 12% by weight measured as $RE_2O_3$ and 1 to 10% by weight silver or copper measured as $Ag_2O$ or CuO.

(2) The exchanged zeolite is then calcined at a temperature of from about 800 to 1400° F. for a period of about 1 to 3 hours.

(3) The calcined silver or copper-rare earth exchanged zeolite is then exchanged with an ammonium salt solution, such as ammonium sulfate, to lower the soda content to below about 0.5% by weight.

(4) The exchanged zeolite is then calcined at a temperature of from about 500 to 1400° F. for a period of 1 to 10 hours.

Optionally, the catalysts prepared above may be reduced in hydrogen atmosphere at a temperature of about 400 to 1200° F. for ½ to 10 hours prior to use.

The catalysts contemplated in the present invention may comprise either essentially 100% Ag-RE-Y or Cu-RE-Y or the catalyst may comprise Ag-RE-Y or Cu-RE-Y admixed with an inorganic oxide component. Where it is desired to obtain a catalyst in fluidized or pelleted form, the precursor synthetic sodium Y-type zeolite ingredient may be in the form of a formed fluidizable or pelleted particle. This fluidized or pelleted particle is subjected to the above exchange and calcination procedures to obtain a catalyst product which is essentially all Ag-RE-Y or Cu-RE-Y.

When it is desired to obtain a catalyst which contains Ag-RE-Y or Cu-RE-Y admixed with an inorganic oxide matrix, the Ag-RE-Y or Cu-Re- Y in finely divided form is blended with a suitable inorganic oxide matrix component. Suitable matrix components are generally described in the prior art, and may be selected from inorganic hydrogels such as silica, alumina and silica-alumina hydrogel. In general, these hydrogel components are essentially amorphous and are readily blended with the highly crystalline Ag-RE-Y or Cu-RE-Y component. It is also contemplated that matrix components such as clay and combinations of clay with amorphous inorganic hydrogels may be combined with the presently contemplated Ag-RE-Y or Cu-RE-Y catalyst component.

As indicated above, the catalysts contemplated herein may be obtained in fluid form wherein finely divided spray dried microspheres having a particular size range of from about 10 to 150μ are obtained using conventional catalyst preparation techniques. It is also contemplated that catalysts suitable for moving or fix bed operation wherein the catalyst particle size ranging from about 5 to 40 mesh may also be obtained using standard catalyst preparation procedures.

The present catalysts are used in the cat-cracking of heavy petroleum feedstocks. Preferably the catalysts are utilized in a conventional manner where the petroleum feedstock such as gas oil is contacted with a bed of the catalyst at a temperature of from about 800 to 1000° F. The contact time of the petroleum feedstock with the catalyst will depend upon the specific catalytic process employer; however, it is found that contact times as low as 5 seconds up to 300 seconds may be advantageously employed using the highly active catalyst of the present invention.

When the present catalyst is used in combination with a typical semi-synthetic matrix, i.e., a matrix comprising silica alumina hydrogel and clay, wherein the Ag-RE-Y or Cu-RE-Y component is present in amounts ranging from about 5 to 15% by weight, the catalyst will exhibit a microactivity on the order of from about 60 to 85 when tested under standard conditions. The product distribution obtained using the present catalyst reveals that high yields of gasoline fractions ($C_4$ through $C_9$) are obtained. These gasoline fractions posses an extraordinarily high aromatic content which is readily measured using standard NMR techniques. It is also found that the present catalysts produce a cracked product which contains only small quantities of undesirable dry gas (hydrogen, $C_1$ and $C_2$) products and only small amounts of coke. This result is entirely unexpected in that it is generally found that the addition of metals such as silver to ordinary catalyst generally increase the dry gas and coke production levels to levels which are not acceptable in commercial cracking processes.

Having set forth the basic aspects of the present invention, the following examples are given to illustrate specific embodiments thereof.

EXAMPLE I

A 200 g. sample of commercial sodium Y-type zeolite containing 13% $Na_2O$ and having a silica to alumina ratio of 5.1 was dispersed in 2 liters of deionized water which contained 200 g. of ammonium sulfate. The mixture was heated to boiling and maintained at that temperature for one hour. The subsequent exchanged solid product was collected on a filter, rinsed with deionized water and then reexchanged with 2 liters of ammonium sulfate solution which contained 200 g. of ammonium sulfate. The solid product was collected and then admixed with 1 liter of rare earth chloride solution which contained the equivalent of 12 g. rare earth oxides. The rare earth solution was heated to boiling for 30 minutes and the solids subsequently collected. The solids were rinsed free of sulfate and chloride and then calcined at 3 hours at 1400° F. The calcined product was then exchanged twice with ammonium sulfate as described previously and rinsed sulfate free. One-half of the resultant product was exchanged with 25 g. of silver nitrate dissolved in 250 ml. of water at 60° C. The other half of the calcined product was similarly exchanged with 50 g. of silver nitrate solution. The resultant silver-rare earth exchanged zeolite was then calcined for 3 hours at 1400° F. The resultant Ag-RE-Y possessed a surface area of 551 and 554 m.$^2$/g. respectively.

Example II

The Ag-RE-Y products obtained above were analyzed for silver and rare earth content. These analyses are set forth in Table I below. These samples of Ag-RE-Y were combined in a semi-synthetic cracking catalyst matrix which comprised 30 parts by weight kaolin clay and 60 parts by weight silica-alumina hydrogel. The hydrogel contained 25% by weight alumina. The Ag-RE-Y was combined in amounts of 10% by weight with the synthetic matrix and subsequently formed into ⅛ inch pills. These pills were heat treated at 1350° F. for 16 hours at 100% steam at 15 p.s.i.g. to stimulate commercial deactivation. The steamed pills were then used to crack gas oil at a temperature of 920° F. and a weight hourly space velocity of 4.3 in a standard microactivity unit. The cracked gas oil was examined for aromatic content using the nuclear magnetic resonance technique fully described in U.S. Pat. 3,693,071. (Application 80,830, filed Oct. 15, 1970 by G. E. Dolbear.)

The catalyst analysis and cracked product distributions are set forth in Table I below. Included in Table I are the product distributions for a standard calcined rare earth type Y (CREY) which was prepared by way of a similar technique which does not contain silver. The results below clearly indicate that the Ag-RE-Y catalyst produced gasoline having a substantially higher aromatic content. This aromatic content is clearly related to a higher octane characteristic.

TABLE I

| Sample No. | Molecular sieve composition, percent of— | | | Microactivity results | | |
|---|---|---|---|---|---|---|
| | $Ag_2O$ | $RE_2O_3$ | $Na_2O$ | Volume percent conversion | Percent coke | Percent aromatic protons |
| 1 | 10.2 | 4.1 | .06 | 71.1 | 4.1 | 15.9 |
| 2 | 13.4 | 4.1 | .06 | 69.0 | 3.7 | 15.7 |
| 3 | 0 | 16 | | 71.5 | | 14.5 |

To determine the effect of reducing the above catalysts with hydrogen prior to use, samples of the catalysts set forth in Table I were reduced in flowing hydrogen for 2 hours at 900° F. prior to steaming. Microactivity results are set forth in Table II below.

TABLE II

| Sample No. | Molecular sieve composition, percent of— | | Microactivity results | | |
|---|---|---|---|---|---|
| | Ag | $RE_2O_3$ | Volume percent conversion | Percent coke | Percent aromatic protons |
| 4 | 9.5 | 4.1 | 73.7 | 4.1 | 17.4 |
| 5 | 12.6 | 4.1 | 72.0 | 4.9 | 16.8 |
| 6 | 0 | 16 | 73.5 | | 15.5 |

From the above, it is concluded that hydrogen reduction of the catalyst further increases its aromatic enhancement properties.

Example III

A 100 g. sample of commercial sodium Y-type zeolite having a soda content of 13% and a silica to alumina ratio of about 5.1 was dispersed in a solution which contained 39.9 g. of lanthanum nitrate $(LaNO_3)_3 \cdot 6H_2O$, which is equivalent to 15.0 g. $La_2O_3$, and 2.94 g. of silver nitrate, which is equivalent to 2.0 g. $Ag_2O$, in 250 g. water. The pH of the lanthanum nitrate-silver nitrate solution was adjusted to 3.1 by the addition of nitric acid. The dispersion of sodium Y zeolite in the silver lanthanum nitrate solution was heated to boiling for 1 hour, and the solids were recovered by filtration. The solids were washed with deionized water until no traces of silver were detected. The exchanged product was then calcined for 3 hours at 1000° F. and then re-exchanged using two boiling exchanges with a solution which comprised 100 g. of ammonium sulfate dissolved in 1 liter of water. The exchanged product was then washed to remove sulfate and dried overnight at 250° F.

Example IV

The silver-rare earth Y zeolite prepared by way of Example III was combined in a semi-synthetic matrix which comprised 30 parts by weight kaolin clay, 60 parts by weight 25% alumina-silica-alumina used in Example III. The Ag-RE-Y was combined with the matrix at a level of 10% by weight. This product was pilled, steamed and subjected to the micro-activity test previously set forth in Example II. The results are set forth below in Table III.

TABLE III

| Sample No. | Molecular sieve composition percent of— | | Microactivity results | | |
|---|---|---|---|---|---|
| | $Ag_2O$ | $RE_2O_3$ | Volume percent conversion | Percent coke | Percent aromatic protons |
| 7 | 7.0 | 12.5 | 75.0 | 2.8 | 18.6 |
| 8 | 0 | 16.0 | 75.0 | | 16.2 |

The above data clearly indicates that as compared to a standard zeolite promoted catalyst which only contains rare earth ions, the silver containing zeolite of the present invention produces substantially greater aromatics as indicated by the increased aromatic proton content.

Example V

Samples of Ag-RE-Y catalysts mixed with a matrix containing 30 parts clay and 60 parts silica-alumina (25% $Al_2O_3$) such as set forth in Example II were subjected to pilot plant testing using two different types of gas oil. The West Texas Gas Oil (WTGO) possessed a gravity of 27.7 API and a boiling range of 610 to 920° F. The Sun Oil gas oil (Sun) possessed a gravity of 30.7 API and a boiling range of 350 to 980° F. For purposes of comparison, samples of catalysts having similar activity which contained various amounts of rare earth-hydrogen type Y zeolite mixed with a synthetic silica-alumina (26% $Al_2O_3$) matrix were also run under similar conditions. The results of the pilot plant testing are set forth in Table IV below.

TABLE IV

| | 10 weight percent AgREY | 6 weight percent REHY | 10 weight percent AgREY | 3.5 weight percent REHY |
|---|---|---|---|---|
| Catalyst | A | B | C | D |
| Steam deactivation | S-13.5 [1] | S-20 [2] | S-13.5 | S-20 |
| Pilot unit conditions: | | | | |
| Temperature, °F | 920 | 920 | 920 | 920 |
| c/o ratio | 4.0 | 4.0 | 4.0 | 4.0 |
| WHSV | 20 | 20 | 20 | 20 |
| Feedstock | WTGO | WTGO | Sun | Sun |
| Conversion, volume percent | 65.5 | 66.5 | 64.5 | 63.0 |
| $C_1+C_2$, weight percent FF | 1.65 | 1.12 | 1.34 | 1.20 |
| Total $C_3$'s, volume percent FF | 9.7 | 8.3 | 10.1 | 7.8 |
| Total $C_4$'s, volume percent FF | 14.5 | 9.3 | 14.7 | 9.9 |
| $C_4$-volume percent FF | 9.4 | 4.0 | 8.3 | 4.0 |
| $C_5$+gasoline, volume percent FF | 49.0 | 57.0 | 47.0 | 53.5 |
| Octane No.: | | | | |
| Research (ASTM) | 92.8 | 88.8 | 90.4 | 86.7 |
| Motor (ASTM) | 78.2 | 77.1 | 77.9 | 76.1 |
| Aniline point °F | 72 | 80 | 70 | 82 |
| Bromine No | 82 | 51 | 47 | |
| Coke, weight percent FF | 5.7 | 4.5 | 5.6 | 3.0 |

[1] 1,350° F.; 100% steam; 12 hours.
[2] 1,520° F.; 20% steam; 12 hours.

It is seen from the above data that catalysts A and C of the present invention produce gasolines having a significantly greater octane than rare earth exchanged type Y catalyst samples B and D. It is also noted that sample A and C produced greater quantities of unsaturated $C_4$ fraction ($C_4=$) than the comparison sample B and D. The increase in $C_4=$ production is totally unexpected. The $C_4=$ fraction is considerably valuable to refiners for use in alkylation processes used to obtain high octane gasoline.

Example VI

*Preparation of Cu-RE-Y*

A 300 g. sample of sodium type Y zeolite (Na-Y) having a silica to alumina ration of 4.9 was mixed with 1.2 l. of water and 150 g. of ammonium sulfate $(NH_4)_2SO_4$ and 11 ml. of concentrated sulfuric acid $(H_2SO_4)$. The mixture was heated at boiling for 1 hour, then the zeolite was recovered and washed free of sulfate with water. The zeolite was then exchanged with rare earth chloride by heating at boiling with a solution of 24 g. of mixed rare earth chlorides dissolved in 1.2 l. water. The zeolite was washed with water and calcined for 3 hours at 1400° F. The calcined zeolite was exchanged with a solution which contained 300 g. ammonium sulfate dissolved in 3 l. of water. The zeolite was washed sulfate free then exchanged with a solution which contained 16.2 g. $CuCl_2 \cdot 2H_2O$ dissolved in 750 ml. $H_2O$. The resulting Cu-RE-Y zeolite was then calcined for 3 hours at 1000° F. This Cu-RE-Y contained 2.3 wt. percent CuO and 5.7 wt. percent $RE_2O_3$.

Example VII

*Preparation of Catalysts*

(A) Various amounts of Cu-RE-Y prepared by the procedure set forth in Example VI were slurried in 200 ml. of $H_2O$. The zeolite slurries were then mixed with various amounts of a finely divided semi-synthetic amorphous cracking catalyst base composition which comprised 30% kaolin clay and 70% amorphous silica-alumina hydrogel mixed in 150 ml. water. The composition was dried, pilled, and steam deactivated by treatment with 15 p.s.i.g. at 1350° F. for 8 hours.

(B) The above procedure was repeated; however, various amounts of RE-Y zeolite were used which was prepared by the procedure set forth in Example I without the copper exchange step. This RE-Y zeolite is used as a blank to compare the selectivity characteristic of the present Cu containing zeolites with a typical prior art RE exchanged zeolite.

Example VIII

Various catalyst samples prepared by the methods set forth in Example VII above, which contained Cu-RE-Y having various metal ion contents, were tested for hydrocarbon cracking activity. The cracked hydrocarbon products resulting from the test (syncrude) were analyzed by gas chromatography for the major olefin fraction of the $C_6$ product and by Nuclear Magnetic Resonance for aromatic protons using the procedure set forth in U.S. Pat. 3,693,071 to Dolbear. The cracking activity test was conducted at 920° F. using West Texan Gas Oil, a weight hourly space velocity (WHSV) of 16 and a catalyst to oil ratio of 5.8. The results are set forth in Table V below.

TABLE V

| Catalyst (Sample) | Promoter (weight percent zeolite) | Description weight percent $CuO-RE_2O_3$ in zeolite | Activity (volume percent conversion) | Olefin (weight percent) | Aromatic hydrogen (percent aromatic protons) |
|---|---|---|---|---|---|
| 1 | 15 Cu-RE-Y | 2.0-4 | 72.3 | 19.1 | 14.0 |
| 2 | 12 Cu-RE-Y | 0.75-6 | 70.3 | 16.5 | 12.9 |
| 3 | 12 Cu-RE-Y | 7.5-6 | 75.8 | 16.6 | 16.4 |
| 4 | 20 Cu-RE-Y | 3.85-6 | 71.8 | 16.1 | 15.4 |
| 5 | 5 RE-Y | 0-17 | 71.5 | 13.9 | 12.8 |

The above data in Table V conclusively shows that cracking catalysts of the present invention (Samples 1, 2, 3 and 4) which contain copper are highly active and capable of producing considerably greater quantities of both olefins and aromatics than a typical non-copper containing prior art catalyst (Sample 5). In view of the fact the octane member of gasoline is generally proportional to olefins and aromatic content, the presently disclosed cracking catalyst composition provides a means by which a petroleum refiner can produce a higher octane gasoline directly from his catalytic cracking unit.

The above examples clearly indicate that valuable cracking actalyst compositions may be obtained using the teachings of the present invention. These compositions are capable of producing commercial quantities of cat-cracked gasoline which possess a higher aromatic content than gasolines heretofore obtained using standard zeolite containing catalysts.

We claim:

1. A process for increasing the aromatic content of the gasoline fractions recovered from catalytic cracking of hydrocarbons which comprises contacting said hydrocarbons under catalytic cracking conditions with a thermally stable zeolite selected from the group consisting of silver-rare earth exchanged Y-type zeolite and copper-rare earth exchanged Y-type zeolite, said zeolite having a silica to alumina ratio greater than about 3, a silver or copper content of about 1 to 10% by weight expressed as $Ag_2O$ or CuO and 1 to 15% by weight rare earth expressed as $RE_2O_3$, admixed with from 50 to 95 weight percent of an inorganic oxide matrix.

2. The process of Claim 1 wherein the matrix is selected from the group consisting of silica-alumina and silica-alumina hydrogels, clay and mixtures thereof.

3. The process according to Claim 1 wherein the zeolite is prepared by a procedure which comprises:
 (a) exchanging a sodium Y-type zeolite with a solution of rare earth and silver ions or a solution of rare earth and copper ions at a pH of from about 3.0 to 3.5 to impart the desired silver or copper and rare earth content;
 (b) calcining said exchanged zeolite at a temperature of 800 to 1400° F. for about 1 to 3 hours; and
 (c) exchanging said calcined zeolite with an ammonium salt solution to lower the $Na_2O$ content thereof to below about 0.5% by weight.

4. The process according to Claim 1 wherein the zeolite is prepared by a procedure which comprises:
 (a) exchanging a sodium Y-type zeolite with an ammonium salt to lower the $Na_2O$ content thereof to about 1.5 to 4% by weight;
 (b) exchanging said zeolite with rare earth ions to impart the desired rare earth content;
 (c) calcining said rare earth exchanged zeolite at a temperature of 700 to 1600° F. for a period of from about 0.1 to 3 hours;
 (d) exchanging said calcined zeolite with an ammonium salt solution to lower the soda content to less than about 1% by weight;
 (e) exchanging said zeolite with a silver or copper salt solution to impart the desired silver or copper content; and
 (f) calcining said exchanged zeolite at a temperature of from about 500 to 1400° F.

5. The process according to Claim 1 wherein the zeolite is a silver-rare earth exchanged type Y zeolite.

6. The process according to Claim 1 wherein the zeolite is a copper-rare earth exchanged type Y zeolite.

(References on following page)

References Cited

UNITED STATES PATENTS

| | | | |
|---|---|---|---|
| 3,508,867 | 4/1970 | Frilette et al. | 252—455 Z |
| 3,607,043 | 9/1971 | McDaniel | 208—120 |
| 3,591,488 | 7/1971 | Eberly et al. | 208—120 |
| 3,647,682 | 3/1972 | Rabo et al. | 208—120 |

DELBERT E. GANTZ, Primary Examiner

J. W. HELLWEGE, Assistant Examiner

U.S. Cl. X.R.

252—455 Z